E. F. PFLUEGER.
Drip-Basins for Barrels.

No. 207,439. Patented Aug. 27, 1878.

Witnesses:
Geo. M. Wright
John J. Wagoner

Inventor:
Ernest F. Pflueger,
by Humphrey & Stuart
Attys.

UNITED STATES PATENT OFFICE.

ERNEST F. PFLUEGER, OF AKRON, OHIO.

IMPROVEMENT IN DRIP-BASINS FOR BARRELS.

Specification forming part of Letters Patent No. 207,439, dated August 27, 1878; application filed July 8, 1878.

*To all whom it may concern:*

Be it known that I, ERNEST F. PFLUEGER, of Akron, in the county of Summit and State of Ohio, have invented a new and useful Improvement in Drip-Basins for Barrels, of which the following is a specification:

My invention relates to basins placed beneath oil, sirup, and other barrels to catch the drip either from leakage of the barrel or faucet.

Heretofore such basins have consisted of simply a shallow pan, with a rack or perforated plate supported some distance above the bottom.

The objection to such basins is that only the drip from the faucet is caught, and what is thus caught becomes filled with dust, flies, and other impurities.

The object of my invention is to provide a secure appliance, easily placed in position, to catch the drip from both barrel and faucet, preserve the leakage from foreign impurities, and afford a clean surface upon which to place the vessels to be filled from the barrel.

To that end it consists of semicircular trough-pieces, placed beneath the barrel, terminating at one side in sloping converging spouts, and a basin, with a wire rack, sloping floor, and tank, protected by a sieve or screen to hold the waste material.

Figure 1:
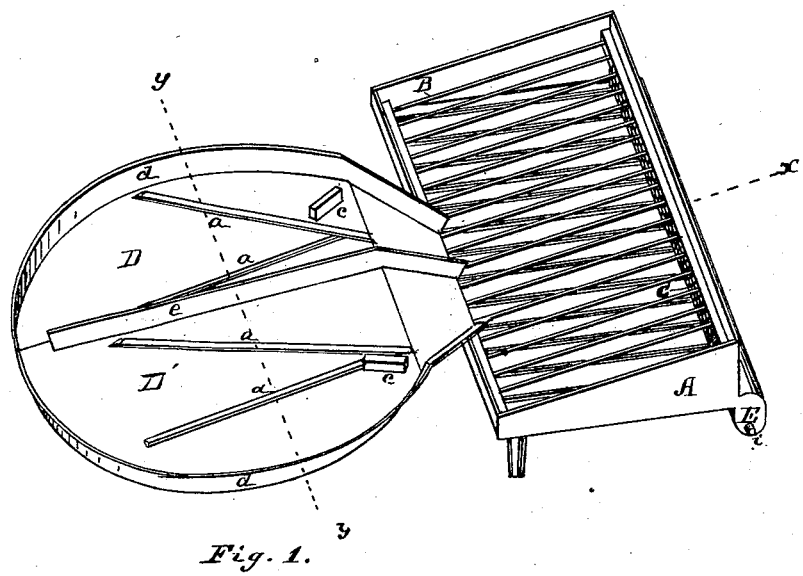
Figure 2:
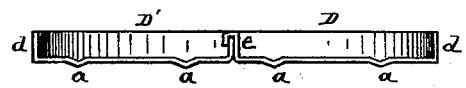
Figure 3:
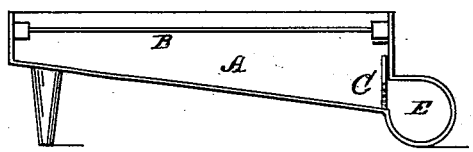

In the accompanying drawings, Figure 1 is a perspective view of my invention; Fig. 2, a cross-section of the circular trough at the line $y\ y$, and Fig. 3 a section of the tank at the line $x\ x$.

The circular trough, preferably of sheet metal, is, for facility of placing the same in position, composed of two semicircular pieces, D D', surrounded by a raised flange, $d\ d$, and terminating at one side in a sloping converging spout, the two pieces D D' connected at the central line by interlocking flanges. The bottom is provided with channels $a\ a$ to carry away the drip to the spout. Two lugs, $c\ c$, rest within the chine, and hold the trough in place. Beneath the spout is placed the basin A, of the form shown. In the upper part of this is a wire rack, B, upon which the vessels to be filled are placed, and which remain at all times approximately clean. The floor of this basin slopes to one side and terminates in a hollow tank, E. This tank E has a delivery-spout, $i$, through which the contents may be emptied. The opening into this tank from the sloping floor is guarded by a screen or sieve, C, which prevents foreign substances, flies, dust, &c., from entering the tank, by which arrangement the drip is preserved from impurities and the loss thereof prevented.

I claim—

1. The semicircular trough-pieces D D', connected by interlocking flanges, substantially as and for the purpose hereinbefore set forth.

2. The basin A, having the rack B, screen C, and tank E, substantially as and for the purpose hereinbefore set forth.

3. The combination of the trough D D' and basin A, having the screen C and tank E, substantially as and for the purpose hereinbefore set forth.

ERNEST F. PFLUEGER.

Witnesses:
C. P. HUMPHREY,
JOHN WEMMER.